United States Patent [19]

Malott

[11] 4,031,991

[45] June 28, 1977

[54] COIN OPERATED ELECTRONIC PARKING METER

[75] Inventor: Steve Malott, Schaumburg, Ill.

[73] Assignee: Qonaar Corporation, Elk Grove Village, Ill.

[22] Filed: Dec. 29, 1975

[21] Appl. No.: 644,598

[52] U.S. Cl. ........................ 194/1 R; 194/DIG. 22; 340/51

[51] Int. Cl.² ........................ G06F 9/00

[58] Field of Search .......... 194/1 M, 1 N, 1 R, 9 T, 194/DIG. 21, DIG. 22, DIG. 23; 340/51; 58/141; 235/92 PE, 92 EA, 92 T, 92 CN

[56] References Cited

UNITED STATES PATENTS

| | | | |
|---|---|---|---|
| 3,166,732 | 1/1965 | Ljungman et al. | 194/1 N |
| 3,917,934 | 11/1975 | Goto | 194/1 N X |
| 3,930,363 | 1/1976 | Rubenstein | 194/DIG. 22 |
| 3,952,850 | 4/1976 | Andersson et al. | 194/1 N |

*Primary Examiner*—Robert B. Reeves
*Assistant Examiner*—Joseph J. Rolla
*Attorney, Agent, or Firm*—McDougall, Hersh & Scott

[57] ABSTRACT

A coin operated electronic parking meter is disclosed. The meter employs a storage memory and two sets of counters. Responsive to the insertion of one or more coins, signals are generated which cause the memory to load a selected number into the first set of counters. The second set of counters are counted up while the first set counts down to zero to load the second set. After loading the meter shifts to a timing mode in which the second set of counters count down at a one count per minute rate. When the second set reaches zero, a flag is tripped indicating that the parking meter is in overtime. A maximum revenue producing circuit is also disclosed which displays the amount of time present on the meter only for the period immediately after the insertion of a coin.

17 Claims, 14 Drawing Figures

COIN DETECT & ADDRG

DOWN COUNTER (DAYS)

DOWN COUNTER (HOURS)

DOWN COUNTER (MINUTES)

UP/DOWN COUNTER (DAYS)

DIVIDER CHAIN (JK FLIP FLOPS)

UP/DOWN COUNTER (HOURS)

UP/DOWN COUNTER (MINUTES)

CONTROL LOGIC

DISPLAY AND GATING

COIN OPERATED ELECTRONIC PARKING METER

BACKGROUND OF THE INVENTION

This invention relates to the field of timing devices. More specifically, it relates to the field of parking meters and like devices which, responsive to the insertion of a coin, token or other device begin a counting period or timing interval. The timing interval is usually determined by the number and value of the coins or tokens inserted into the device. While the present invention is most specifically adapted for use as a parking meter for automobiles, it will be appreciated that the design is also intended for use in other environments. For example, as meters to control car heaters, to control lighting at outdoor sports facilities, such as tennis courts, basketball courts, and the like, to control the use of various amusement devices. In general, the meter of the present invention can be used wherever it is desired to control a period of use depending upon the insertion of a number of coins or tokens.

Parking meters and similar timing devices are known in the art. However, such devices have in the past been primarily mechanical devices utilizing springs, gears, and like mechanical components to accomplish the desired purpose. A drawback in the use of solely mechanical components is the degree of servicing which is often required by such units. The parts wear and require lubrication and replacement at frequent intervals.

In the electronic field devices for timing events have been known. However, a design capable of operating under the conditions necessary for a parking meter have not previously been obtained. That is, parking meters typically must operate within a temperature range of −35° to +100° F. in order that they may be utilized in all weather conditions. Further, since a large number of such meters would be provided in a city of any substantial size, an electric design permits the servicing interval to be sufficiently long so that the meters do not require frequent attention.

Other advantages of an electronic meter over a mechanical or electromechanical meter include the ability to obtain a variety of options which are not easily implemented in mechanical and electromechanical meters. For example, by merely programming the electronics of the present invention each coin inserted by a user at a given time can be assigned a different value, i.e., the first quarter dollar inserted in the meter might correspond to two hours of parking time while a second quarter would correspond to one hour and a third quarter 30 minutes. Alternatively, if desired, a constant rate for each coin can be provided. An additional feature which is easily incorporated is what is referred to as MRP operation. MRP stands for "maximum revenue production" and is any means whereby when a motorist pulls into a parking space he is compelled to insert coins rather than to depend upon the time purchased by the previous user of the space.

It is accordingly an object of the prevent invention to provide an electronic coin operated parking meter capable of operating under severe weather conditions with long service intervals.

Another object of the present invention is to provide an electronic parking meter which can be preprogrammed to accommodate various options desired by the end user, such as MRP operation, and variable rate coin operation.

It is a further object of the invention to provide an electronic timing meter which can be utilized wherever a coin operated timing device is required.

Other objects and advantages of the present invention will become apparent from the remaining portion of the specification.

DETAILED DESCRIPTION

GENERAL ORGANIZATION

Figure 1:
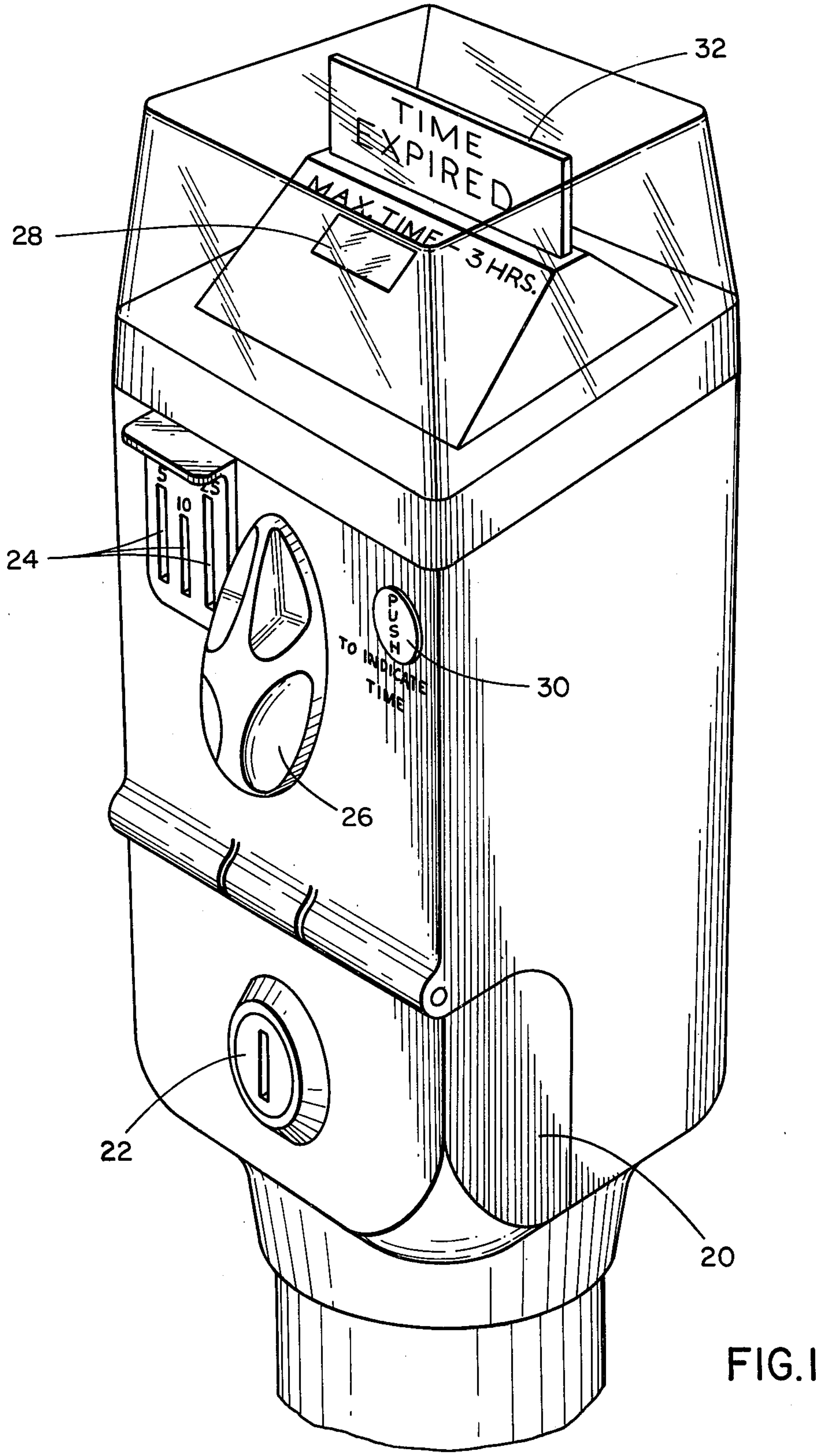
FIG. 1 is a perspective view of an electronic parking meter according to an embodiment of the invention.
Figure 1A:
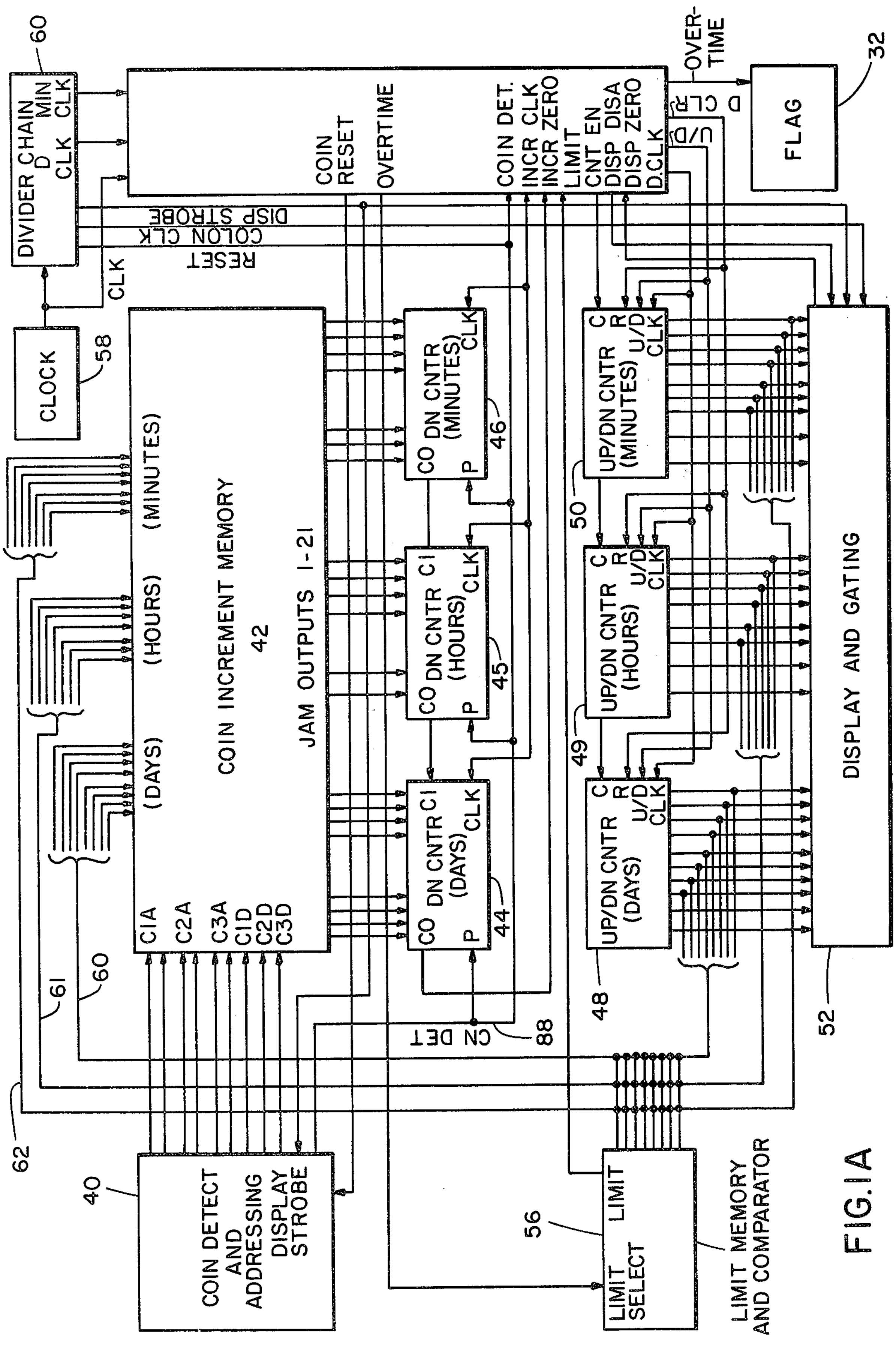
FIG. 1A is a block schematic of an electronic meter according to the present invention.

Referring to FIGS. 1 and 1A, the general layout of the present invention is illustrated. In FIG. 1 a possible meter case for housing the electronic meter according to the present invention is shown. The meter case includes a coin receptacle 20 which may have a tamperproof lock 22, and one or more coin slots 24 as, for example, to receive nickels, dimes and quarters. A rotating handle 26 is utilized for mechanically producing the necessary signals for the electronic meter when coins are inserted. That is, a coin is inserted in one of slots 24 and the knob 26 is rotated. Electrical contacts are provided on the shaft connected to knob 26 to produce the necessary input signals.

Depending upon the amount of money placed into the meter, the correct number of days, minutes and hours are displayed on display 28. According to one embodiment of the invention the display fades after a short period of time as, for example, one minute. This is in connection with the maximum revenue production mode of operation (MRP). In a modified form of MRP operation a push button 30 may be utilized to permit the pedestrian who has parked his car to determine how much time is left on the meter after the display has blanked.

When time has expired, the display 28 can change color, or blank, or alternatively a mechanical shutter or device, such as flag 32, can be actuated. The flag 32 may carry an indicia such as "time expired" to readily identify the car parked at that meter as one which is in violation of parking regulations. The meter illustrated does not differ significantly in size or in operation as far as the motoring public is concerned. It is expected that little, if any, problems will result from the substitution of a meter according to the present invention for traditional mechanical and electromechanical meters.

GENERAL OPERATING SEQUENCES

Referring now to FIG. 1A, the basic electronics of the present invention are illustrated in block form. The invention includes a coin detect and addressing block 40, a coin increment memory 42, down counters 44, 45 and 46, up/down counters 48, 49 and 50. Counters 44 through 46 and 48 through 50 correspond to counters for days, hours and minutes, respectively.

The output from the counters 48 through 50 drives the display and gating block 52 while the operation of the device is controlled by control logic 54 and limit memory 56. The system runs on a system clock 58 and intermediate clock values are produced by divider block 60. If utilized a mechanical flag 32 is operated from the control logic 54. The device is battery powered and depending on the design selected, several year intervals may be obtained between battery replacements.

The system is initiated by the detection of coins inserted into the meter. Depending upon the number and value of coins inserted, the coin detect block 40 addresses various locations in the coin increment memory 42. Stored at each location in the memory 42 is a numerical value which is provided to the jam outputs 1 through 21. The information provided on the jam outputs is utilized to preset the down counters 44 through 46 to the selected numerical value. This operation takes place during what will be referred to as the "increment mode". After being preset, the down counters count down from the preset value to zero at a high frequency. As counters 44–46 are down counted, the up/down counters 48–50 are up counted at an identical rate.

When counters 44–46 reach zero, up counters 48–50 will be incremented by the value selected by the coin increment memory 42. If the meter was in overtime or at zero, the counters will be at the selected value. If time remains when a coin is inserted, the selected value will increment the time period remaining. This value is displayed by the display and gating circuit 52 and the meter then switches from increment mode to the "run mode". In the run mode the up/down counters 48–50 begin down counting at one count per minute until they reach zero.

When the up/down counters reach zero, the control logic places the meter into an "overtime mode". At the start of a selected overtime period the limit memory and comparator 56 causes the control logic to actuate flag 32 or other appropriate device for signalling a meter violation. At the end of the overtime interval the meter shuts off. If desired a municipality may levy a less costly fine for violations while the meter is still in overtime than for long term violations.

The coin increment memory 42 can be programmed by means of the programming inputs on lines 60, 61, and 62, it being appreciated that these lines are really representative of a large number of programming lines. The memory 42 can be programmed in a variety of ways depending upon the desired application. For example, the coin increment memory can be utilized to provide a set amount of time for a first coin, i.e., two hours while providing only one hour for a second coin of the same value and perhaps only 45 minutes for a third coin inserted into the meter. It will, therefore, be appreciated that for each type of coin (nickel, dime, quarter, etc.) and for each coin of a given type (first, second, third) it is possible to program a different time value to which the meter will respond simply by so programming the corresponding increment memory locations.

If the meter is to always provide the same time increment for a given coin type, the size of the coin increment memory can be reduced and similarly if the meter need not provide capability for days or hours, the number of counters can be reduced thereby effecting cost savings.

COIN DETECT AND ADDRESSING

Figure 2:
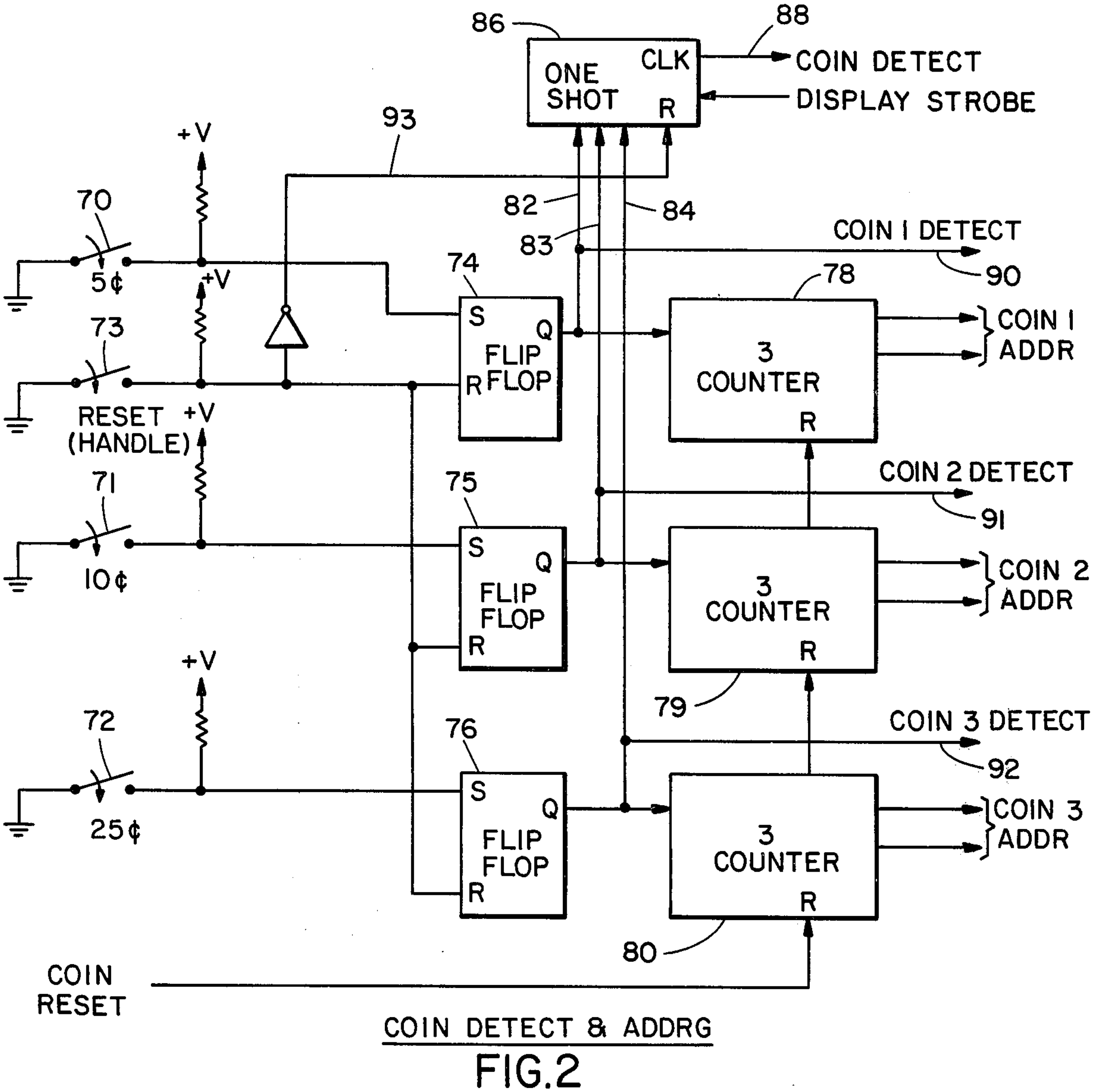
FIG. 2 is a schematic diagram of the coin detect and addressing block of FIG. 1A.

Referring now to FIG. 2, the coin detect and addressing block 40 is shown in greater detail. As mentioned earlier in the general description section, contacts are provided on the mechanical shaft connected to the knob 26 of FIG. 1 such that when a coin is inserted into the meter and the knob rotated contacts 70, 71, and 72 are closed depending on whether, for illustration, a nickel, dime or quarter has been inserted into the coin slots. On the return movement of the handle 26 the reset contact 73 is closed. The contacts 70 through 73 may be provided on a conventional coin shaft mechanism well known in the art. Closing the contacts generates the necessary electrical signal by completing a circuit from the meter battery. In the case of contacts 70–72 the corresponding one of RS type flip-flops 74 through 76 receives a "low" pulse at its S input.

This produces a high Q output from the selected flip-flop which is provided to a module 4 counter 78 in the case of flip-flop 74 or counter 79 or 80 in the case of flip-flops 75 and 76, respectively. The Q outputs are provided via lines 82–84 to a one shot multivibrator 86. These lines trigger the one shot multivibrator producing an output on line 88 which is identified throughout this disclosure as the "coin detect signal".

The Q outputs are also provided via lines 90 through 92 directly to the coin increment memory 42 and these signals are identified as the "coin 1 detect", "coin 2 detect", and "coin 3 detect" signals, respectively, sometimes abbreviated *c–d*. The signals on lines 90–92 select a given section of the coin increment memory to which an address produced by the counters 78 through 80 is applied. The function of the counters 78 through 80 is to determine whether the coin detected is the first, second or third coin of a given type inserted by the user during a given interval.

For example, when a first coin is inserted, counter 78 having previously been reset, goes from a count of zero to one. This count is provided to the coin increment memory 42 via the lines marked coin 1 address. A second coin produces a binary output from counter 78 representative of two, while a third coin produces a binary count of three. As will be apparent, by differentiating between the first, second and third coin, it is possible to separately address different locations in coin increment memory 42 to obtain different time amounts for a given coin. If it is desired to provide the identical time increment for every coin of a given denomination inserted, the counters 78–80 can be omitted. Handle 26 resets flip-flops 74 through 76. During overtime mode counters 78 through 80 are reset via the coin reset signal from control logic 54. One shot 86 is reset by the reset pulse from contact 73 via line 93.

COIN INCREMENT MEMORY BLOCK

Figure 3:
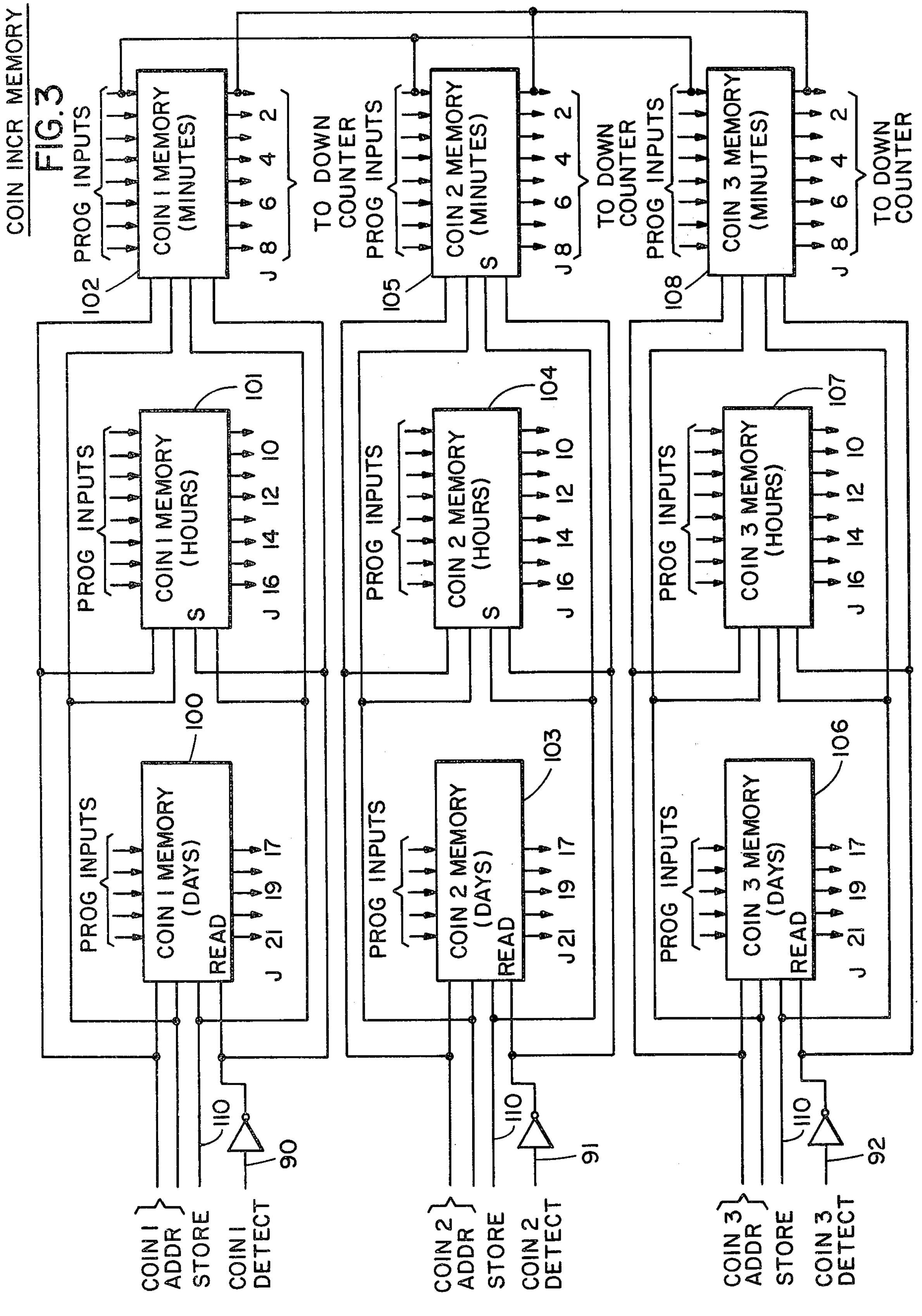
FIG. 3 is a schematic of the coin increment memory block of FIG. 1A.

Referring to FIG. 3, the coin increment memory 42 is illustrated in greater detail. For the particular embodiment shown and described in this application, nine memory segments 100 through 108 are illustrated. Each memory segment is identical and may be a commercially available memory chip such as that manufactured by RCA Corporation under its designation CD4036AD or equivalent. Memory segments 100 to 102 receive data relative to a first coin, i.e., a five cent coin, from the coin detect and addressing block 40. Elements 103 through 105 receive information relative to the second coin while 106 through 108 receive information relative to a third coin. The coin 1 detect signal from line 90 identifies memory segments 100 through 102. Similarly, coin 2 detect and coin 3 detect signals on lines 91 and 92 select either of the lower two segments of memory. Depending upon the binary count received on the address line, i.e., a one, two or three, different locations in the memory segments are identified.

Depending upon which memory location is selected, a stored number is provided to the jam outputs of the memory segments. Jam outputs 1 through 8 correspond to minutes; 9 through 16 to hours; and 17 through 21 to days. These jam outputs are provided as inputs to the down counters 44 through 46.

The memory segments 100 through 108 are programmed to provide the predetermined number by means of the programming inputs in the presence of a store signal on line 110. The memory elements can be preprogrammed at the factory or easily changed in the field when it is desired to change the relationship between a given coin and the amount of time purchased thereby. As indicated in FIG. 1A, by means of the programming lines 60 through 62 a technician merely displays the number he wishes to store in the memory segments on the display and applies the proper store signal on line 110 to change the memory value.

As with the coin detect and addressing block, it will be apparent that where the meter does not require days and/or hours the number of memory segments necessary to implement the coin increment memory 42 may be substantially reduced. A further reduction in the amount of memory required may be obtained where all coins are to have the same value and, therefore, fewer memory locations are necessary.

DOWN COUNTERS

Figure 4:
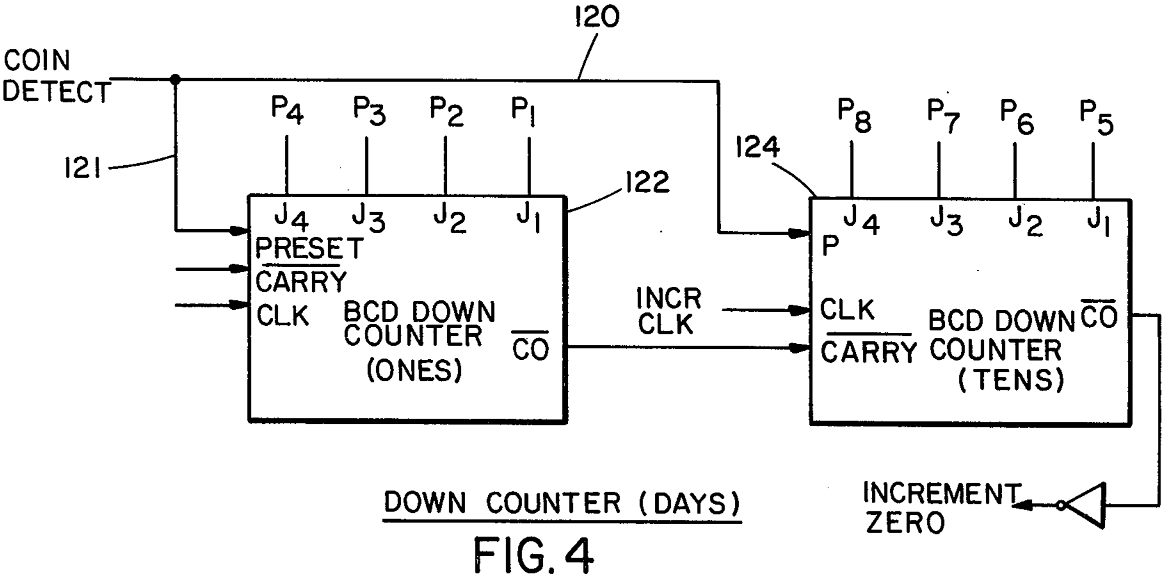
FIG. 4 is a schematic of the down counter (days) block of FIG. 1A.
Figure 5:
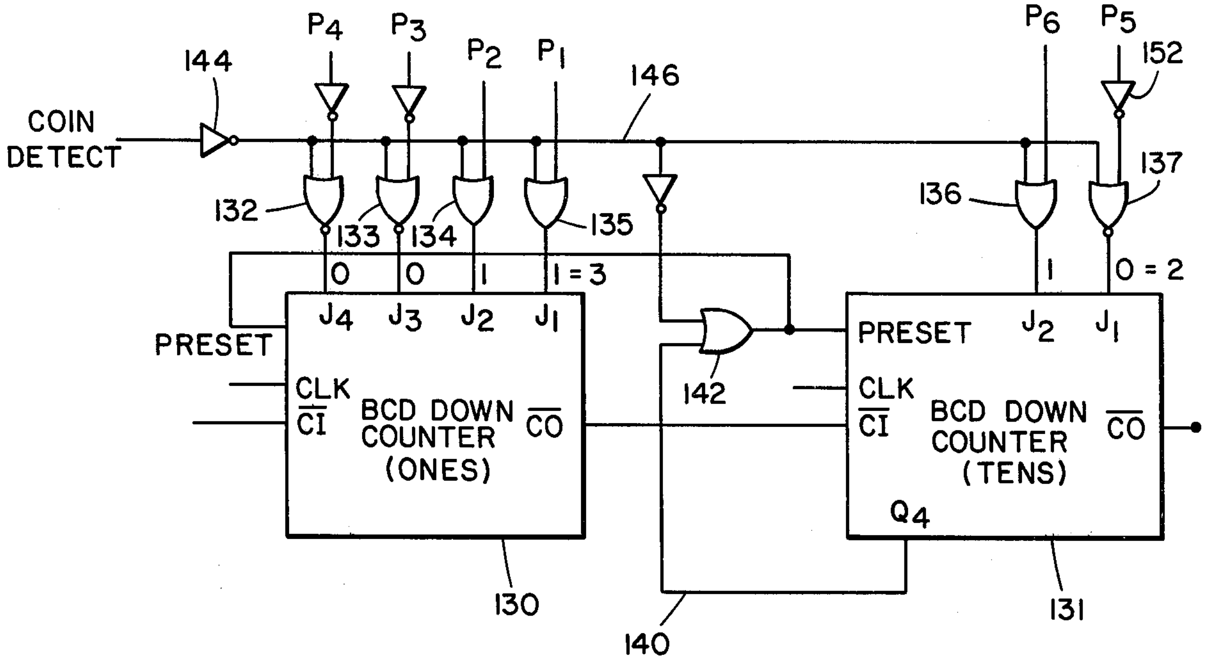
FIGS. 5 and 6 are schematic diagrams of the down counter hours and minutes blocks of FIG. 1A.
Figure 6:
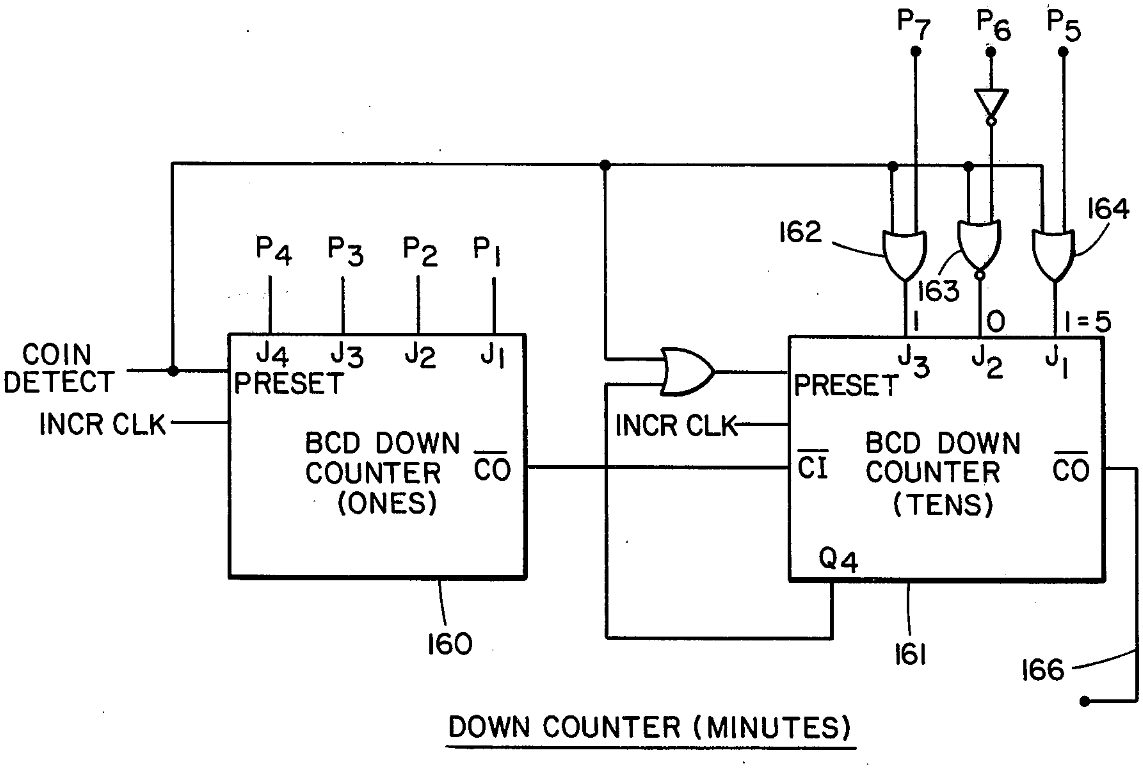

Referring now to FIGS. 4, 5 and 6, the down counters are illustrated in greater detail. As indicated in FIG. 1A, the coin detect signal from the coin detect and addressing block 40 is provided to each of the down counters on line 88 to their preset input. Each of the down counters is clocked by the increment clock signal from the control logic 54, and each of the down counters has a carry input and output. The carry output from the days down counter is provided as an input to the control logic 54 and is designated increment zero.

Turning now to FIG. 4, the days down counter is illustrated. The coin detect signal is provided to each of two segments of the down counter on lines 120 and 121 to the preset inputs of these signals. Each segment is a commercially available counter unit such as RCA No. CD4029AD or equivalent. These units are capable of counting up or down and can do so in binary coded decimals (BCD) or in decimal, as desired. Counters 122 and 124 are set to down count in binary coded decimal. Counter segment 122 represents the ones digit, while counter segment 124 represents the tens digit of a two digit number indicative of the number of days. In a down count mode the counter segments 122 and 124 have carry inputs and outputs which are really borrow inputs and outputs. Thus, the counter segments operate in the usual manner such that when the segment 122 down counts to zero, the segment 124 is decremented and the segment 122 resumes down counting from 9. The input to the days down counter includes the increment clock signal from the control logic 54, the preset inputs P1 through P8 from the jam outputs of the coin increment memory 42, and the indicated carry inputs and outputs. The carry output from the counter segment 124 is the increment zero signal supplied to the control logic to indicate that all the down counters have reached zero.

The days down counter illustrated in FIG. 4 counts down from a maximum of 99 days or from any other period depending upon what number is preset into the P inputs from the increment memory 42. The down counters are preset when the coin detect signal is received. After the counters are preset, the increment clock applied from the control logic down counts the counters to zero at which time the increment zero signal is produced from the carry out of counter segment 124. The down counter is down counted at a relatively high frequency. The system clock 58 is desirably on the order of 35 KHz. The increment clock signal utilized for the down counters is approximately the same frequency.

Referring to FIG. 5, the hours down counter is illustrated. The hours down counter differs from the days down counter only in the following respects. In order to make the down counter a 24 hour counter instead of a modulo 100 counter, an OR NOR matrix is provided at the P inputs to the counter segments. Thus, in FIG. 5 counter segments 130 and 131 have logic gates 132 through 137 connected to selected ones of the preset inputs. During preset the counters are loaded via inputs P1 through P6 with a number from the increment memory 42 in the presence of the coin detect signal. Any number from 0 through 23 can be preset into the down counter segment from the increment counter 42. In the down counting mode, however, it is desired that each time the down counter segments reach zero, they be immediately reset to 23 before the down count resumes. This is accomplished in the following manner. The Q4 output from the down counter segment 131 is provided via line 140 and OR gate 142 to the present inputs of both segments. It will be remembered that during the down count the coin detect signal will be low. Due to inverter 144 this produces a high signal on line 146. Thus, whenever a coin detect signal is not present, the preset inputs to the counters 130 and 131 can be selected to preset a desired number by changing gates 132 to 137 appropriately. In order to make the down counter a 24 hour down counter, gates 132 and 133 are selected to be NOR gates such that the J3 and J4 inputs to counter 130 are zero due to the presence of a high signal on line 146 while gates 134 and 135 are simple OR gates. This effectively inserts a binary 3 into the down counter 130 each time the Q4 output is applied to the preset inputs of the counter segment.

Similarly, with counter 131 a binary 2 is preset every time it reaches zero. In the presence of a coin detect signal line 146 goes low permitting the counters to be set in the normal manner described in connection with FIG. 4 to a value from the increment memory. The carry out from the counter segment 131 is provided to the days counter carry input while the carry in at counter 130 is from the carry out of the minutes down counter.

Referring to FIG. 6 the minutes down counter is illustrated. Like the previous down counters it consists of two counter segments 160 and 161 and as with the FIG. 5 down counter employs a gating network including gates 162, 163 and 164 to repetitively insert a count of 59 into the counter segments each time they reach zero during the down counting mode. It will be apparent that in this case no gating is required for the segment 160 since it automatically resets to 9 and, therefore, gating is required only for segment 161 so that it resets to 5 rather than to 9. The carry output from the minutes down counter on line 166 is provided to the hours down counter of FIG. 5.

Summarizing operation of the down counters 44 through 46, it will be apparent that the down counters operate in two modes. In a preset mode a signal is applied to their preset input from the coin detect line 88 effective for presetting an initial count into the counters from the coin increment memory 42. The down counters then switch to the count mode and count at a rate determined by the increment clock signal from the control logic 54. The down counters count down sequentially from the preset value to zero. The minutes and hours down counters continually recycle from 0 to 59 minutes and from 0 to 23 hours, respectively, until the days down counter reaches zero. At this point the increment zero output is produced which is detected by control logic 54 indicating that all three counters have reached zero.

It will be seen that when a coin is inserted into the meter a unique number is determined from the coin increment memory. This number is applied to the down counters which then count down from this number to zero. This down count is utilized to increase the value of the up/down counters 48–50, as will now be described.

UP/DOWN COUNTERS

Figure 7:
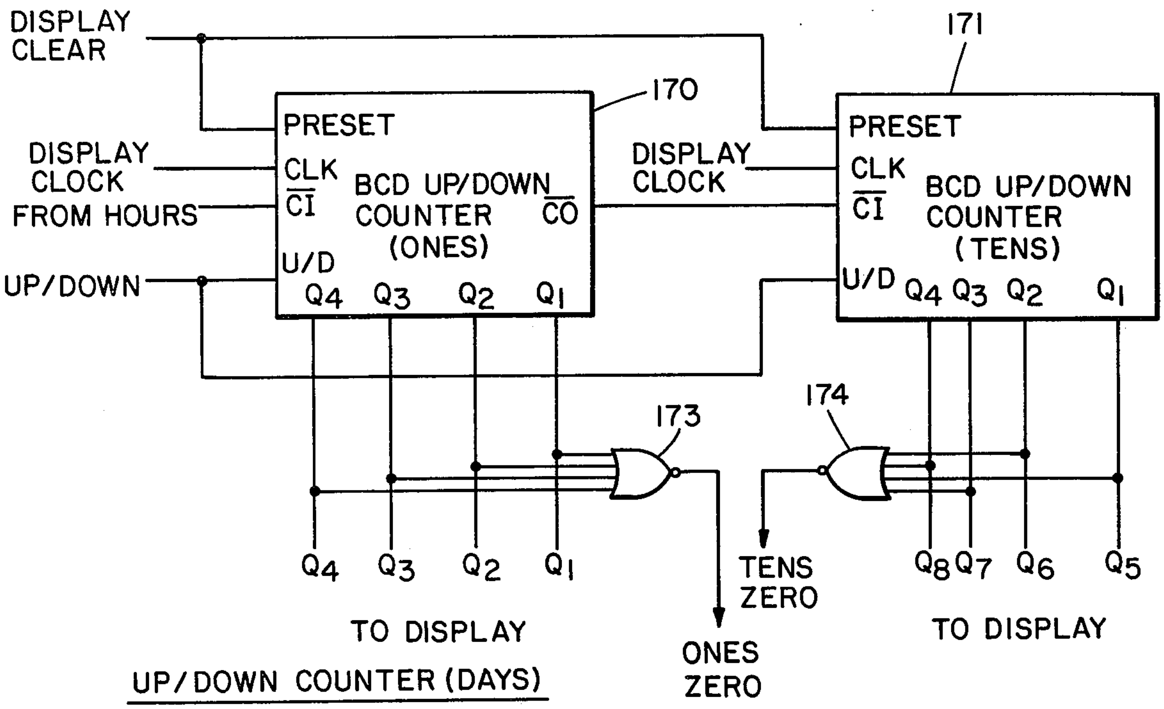
FIGS. 7 and 7A are schematics of the up/down counters (days and hours) of FIG. 1A.
Figure 7A:
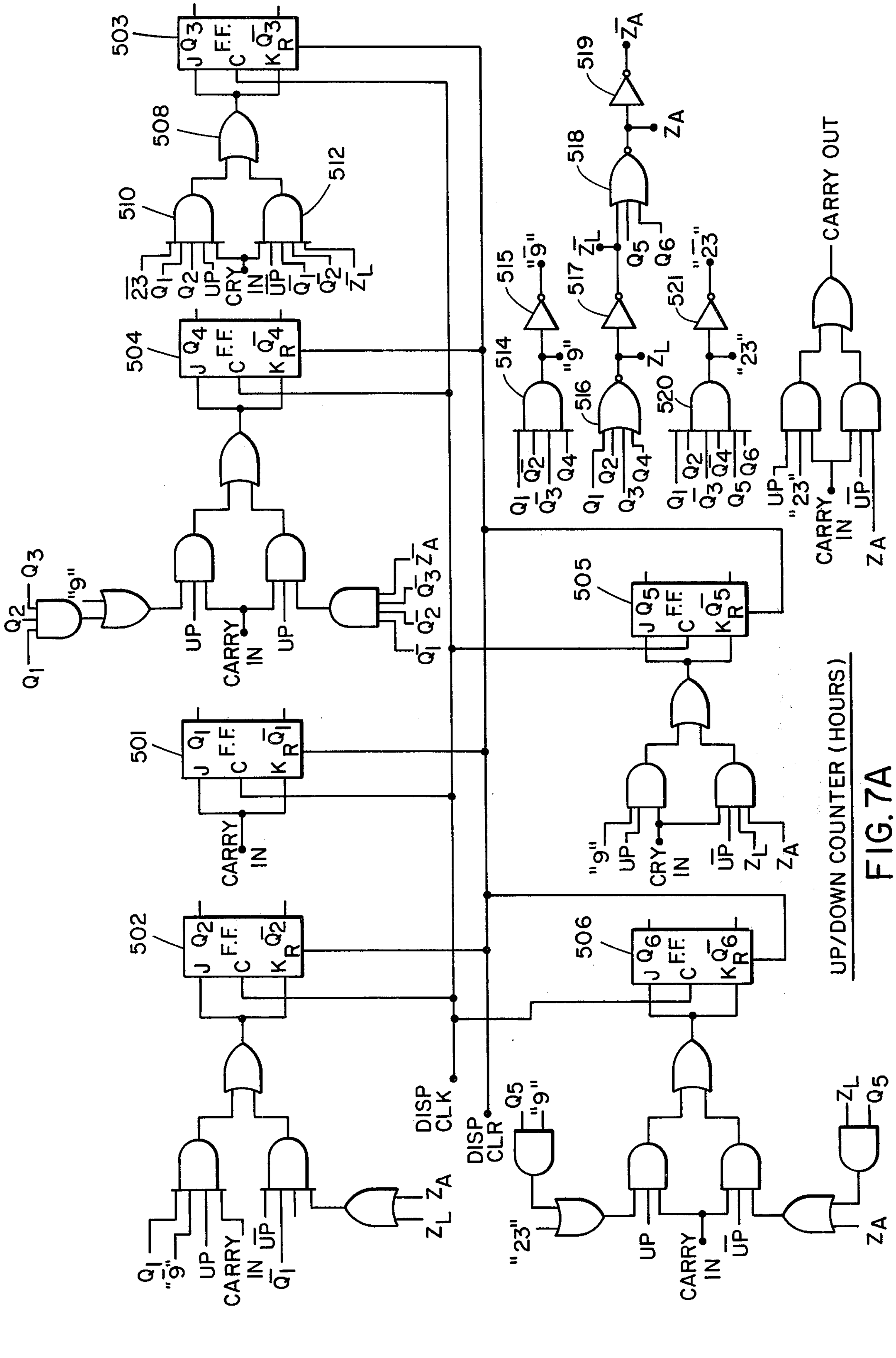
Figure 8:
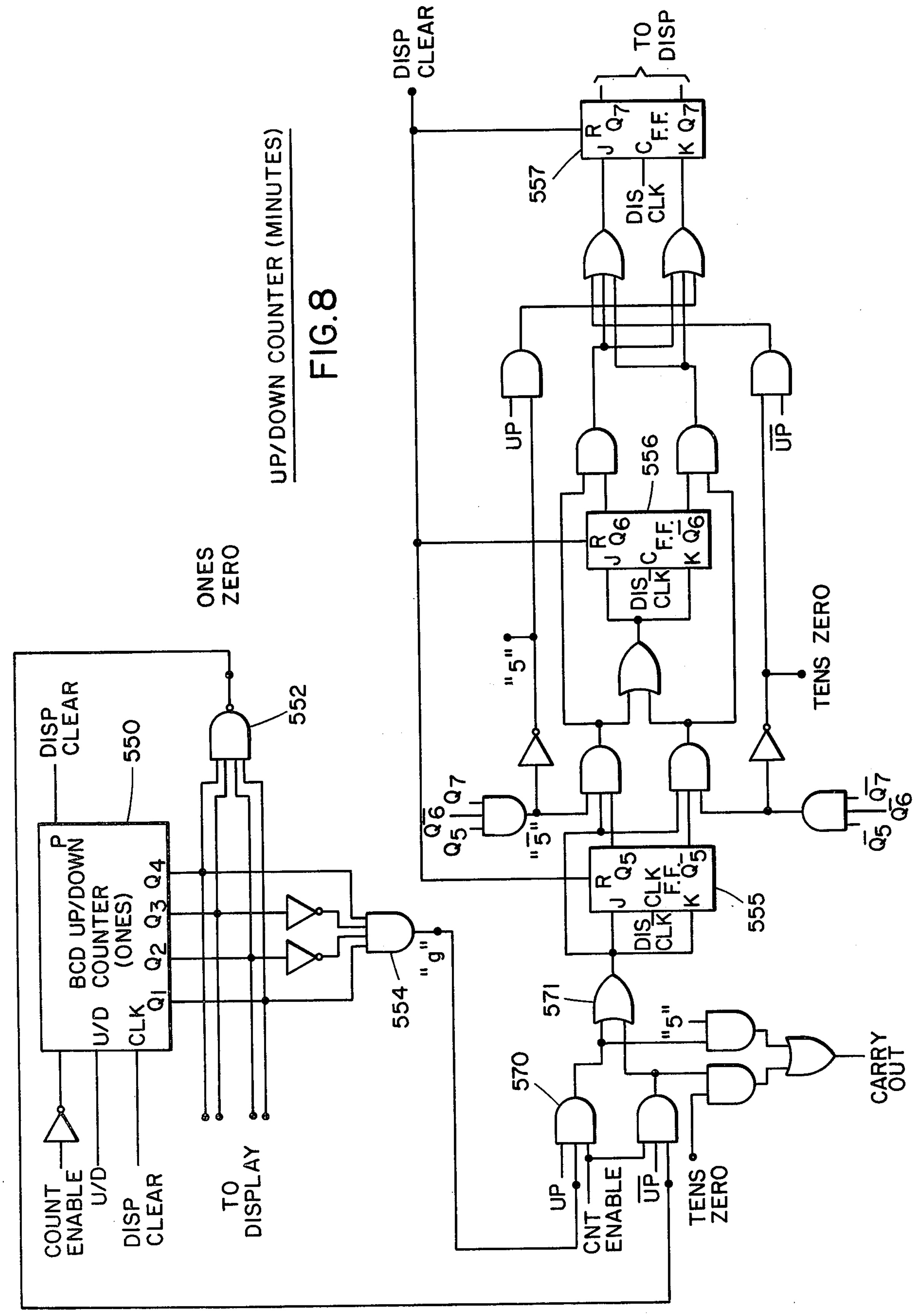
FIG. 8 is a schematic of the up/down counter (minutes) block of FIG. 1A.

Referring now to FIGS. 7, 7A and 8, the details of up/down counters 48 through 50 are illustrated. Up/down counter 48 is illustrated in FIG. 7 and comprises a two segment counter including segments 170 and 171. These segments may be implemented by available integrated circuits such as RCA CD4029AD or equivalent. The inputs to the counter segments are a display clear segment from the control logic 54 which is applied to the preset inputs of the counter segments, a display clock signal applied to the clock inputs and an up/down (*u*/*d*) signal which controls the operating sequence of the counters. That is, when an up signal is applied, the counter segments count up and when the down signal is applied down the counters count down.

As has been stated earlier, the down counters 44 through 46 are initially preset with a number from the coin increment memory 42. They are then counted down from this preset value to zero at a high clock rate. Simultaneously, with the down count of counters 44 through 46, up/down counters 48 through 50 are counted up at the same clock rate until the down counters reach zero. Thus, every time a coin is inserted in the meter, the up/down counters are counted up by an amount equal to the number preset into the down counters. In this manner each additional coin will serve to increase the number inserted into the up/down counters.

After the increment mode is complete, the control logic 54 applies a second clock rate to the counters 48 through 50 and switches their operation from up count to down count. The second clock rate is one approximately equal to a real time clock, i.e., a one pulse per minute clock rate. Thus, the up/down counters begin down counting from their initial value reached during the increment mode.

The outputs from the counter segments 170 and 171 are taken on the lines Q1 through Q4 and Q5 through Q8, respectively. These outputs are applied to the display and gating block 52 to drive a display to be described. In order to identify when a particular one of the counters 48 through 50 is at zero, NOR gates 173 and 174 are provided. When all of the Q outputs are zero, these gates produce a high output. The outputs from these gates may also be utilized to produce zero suppression in the case of a digital display.

Referring now to FIG. 7A, the up/down counter 49 is illustrated. It will be observed that the up/down counter 49 is significantly different than up/down counter 48 which is a commercially available item. This is due to the fact that counter 48 need not reset to a specific value. That is, with regard to counters 49 and 50, it is necessary that these counters reset to a specific number each time they reach zero or their maximum. For example, during the increment mode, the up/down counters are counting up. Every time counter 49 reaches 23 hours it must increment the days counter and reset itself to zero. Conversely, in the down count mode every time counter 49 down counts to zero it must decrease the count on counter 48 and reset itself to 23. A similar statement is true with regard to the minutes up/down counter 50, and thus these counters must be individually implemented.

FIG. 7A discloses an up/down counter which will reset itself to zero during an up count every time it reaches 23 and produce a carry and conversely it will reset itself to 23 during a down count every time it reaches zero. Counter 49 comprises a set of six flip-flops indicated as 501 through 506. Each flip-flop receives (1) a clock signal from the control logic 54 on the display clock line, (2) the *u*/*d* signal determining whether the counter is to count up or down and (3) a reset signal from the display clear output of the control logic.

Each of flip-flops 501 through 506 has a different set of logic gates provided across their J–K input whereby when the condition set up by the logic is satisfied the flip-flop will toggle. The outputs from the various flip-flops are utilized as inputs to the logic gates for others of the flip-flops to achieve the appropriate gating conditions to obtain the automatic resetting in both the up count and down count mode. For example, the input to flip-flop 503 via OR gate 508 and AND gates 510 and 512 are a plurality of signals including the Q1 and Q2 signals from flip-flop 501 and 502, the up signal from the up/down line, the enable signal from the count enable line, and so on. It will be observed that some of the logic gates have as inputs intermediate values designated herein as $Z_L$, $Z_a$. These intermediate quantities are produced by additional gating 516–519.

By specifying all of the inputs to the gating logic it will be apparent to a routineer in the art that the counter disclosed in FIG. 7A will count up to a maximum of 23, provide a carry output and reset to zero and continue counting in the up count mode. Conversely, in the down count mode it will down count from whatever number it is preset to during the increment mode until it reaches zero. It will then borrow from the days counter 48 and reset itself to 23 and continue down counting.

While it is believed apparent from the drawing and above description how this counter works, nevertheless in order to further assist a routineer in the art, the following toggle condition equations of the flip-flops 501 through 506 are specified which equations fully define the operation of counter 49.

TOGGLE EQUATIONS $Q1_T = \text{Enable}$ $Q2_T = \text{UP.Enable.}Q_1.9 + \text{Up.Enable.}Q_1.(Z_L+Z_A)$ $Q3_T = \text{Up.Enable.}Q_1.Q_2.23 + \text{Up.Enable.}Q_1.Q_2.Z_L$ $Q4_T = \text{Up.Enable.}(Q_1.Q_2.Q_3+9) + \text{Up.Enable.}(Q_1.Q_2.Q_3.Z_A)$ $Q5_T = \text{Up.Enable.}9 + \text{Up.Enable.}Z_L.\ Z_A$ $Q6_T = \text{Up.Enable.}(Q_5.9+23) + \text{Up.}(Z_L.Q_5+Z_A)$ where $Qi_T$ = toggle condition for the ith flip-flop Referring now to FIG. 8, a schematic of the up/down counter 50 for minutes is illustrated. As with up/down counter 49, this counter cannot be entirely implemented by off the shelf packages since it must reset to one number in the up count direction and reset to a different number during down counting. In particular during up count (i.e., the increment mode) every time it reaches 59 it must produce a carry out to the hours counter 49 and reset itself to zero. During the down count it must subtract one count from counter 49 and reset from zero to 59 to continue counting. The minutes counter 50 preferably is implemented using an RCA CD4029 up/down counter in conjunction with the gating illustrated in the bottom portion of FIG. 8.

The outputs from the counter 550 are Q1 through Q4 which outputs are provided to NAND gate 552 to produce a ones zero signal when all four outputs are low. Similarly, these outputs are provided to an AND gate 554, Q2 and Q3 being inverted, to produce an output which is the BCD equivalent to a decimal 9. The inputs to counter segment 550 are the inverted count enable signal, up/down signal, the display clock and display clear signals. The counter segment 550 represents the ones portion of the minutes display while the lower gating portion of the FIG. 8 represents the tens. The tens segment utilizes three flip-flops 555 through 557 with appropriate logic provided to the J–K inputs of each. As with the hours counter 49, specifying the inputs to the various logic gates for each of the flip-flops determines the necessary logic equations in order to produce the desired result.

The result desired, of course, is that during the up count the upper segment 550 should reset to a zero every time it reaches 9, while the lower segment should reset to zero every time it reaches 5 and provide a carry out to the counter 49. During the down count it is desired that the upper segment 550 reset to 9 every time it reaches zero, while the lower segment should reset to 5 every time it reaches zero and should borrow from counter 49.

Intuitively, the tens segment can be understood by recognizing that, for example, during up counting flip-flop 555 toggles when the ones segment reaches 9 via gates 570 and 571. The ones segment is reset to zero while the tens segment is now one. Next time the ones segment reaches 9, and since Q5 is high, flip-flop 556 will toggle and so on.

DIVIDER CHAIN

Figure 9:
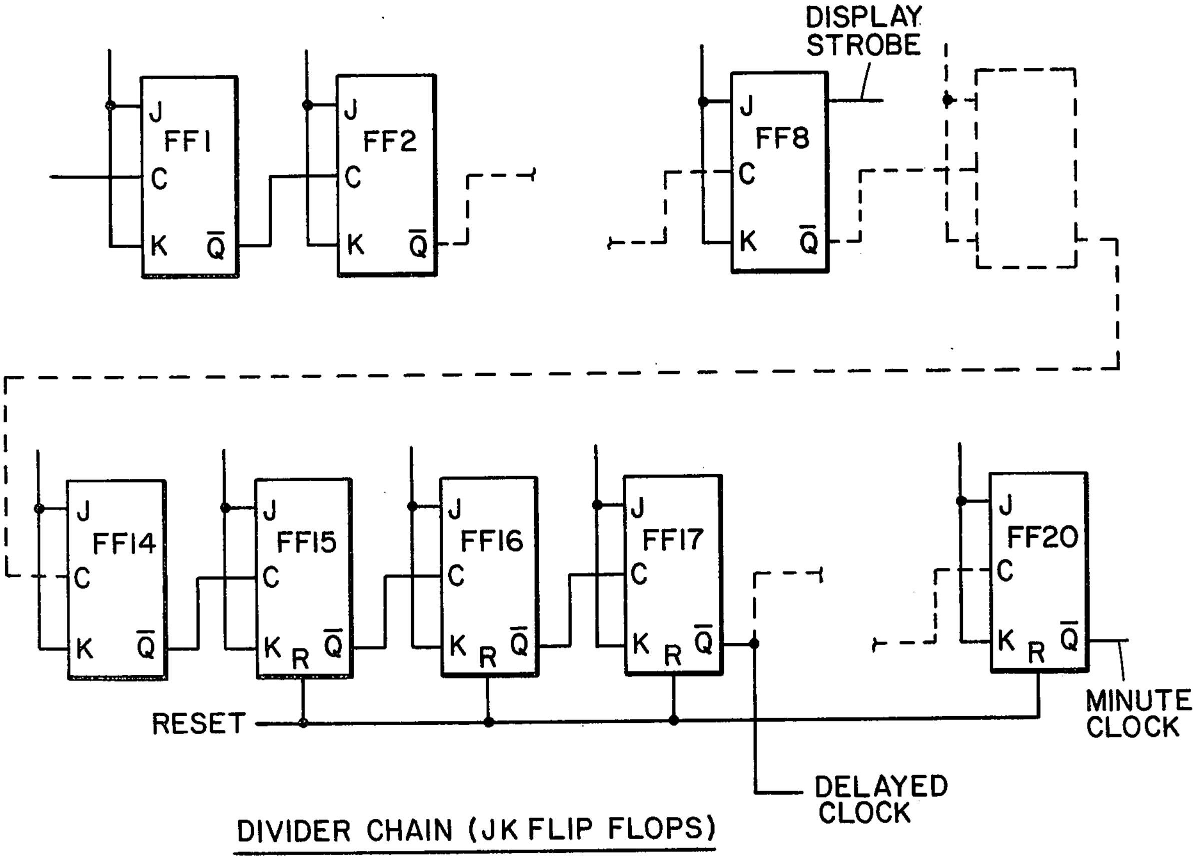
FIG. 9 is a schematic of the divider chain block of FIG. 1A.

Referring to FIG. 9, the divider chain utilized to obtain the various clock frequencies is illustrated. The divider chain is simply a plurality of serially connected J–K flip-flops. The flip-flops are connected to toggle whereby each flip-flop effects a division by two in the clock frequency. Clock 58, as has been stated, preferably is approximately 35 KHz. This clock signal, after passing through the divider chain at flip-flop 20, produces the minute clock (one count per minute) which is provided to the control logic for driving the up/down counters 48 through 50. The output from flip-flop 17 is the delay clock (D clock) utilized by the control logic while the output from flip-flop 8 is utilized for a display strobe signal.

CONTROL LOGIC

Figure 10:
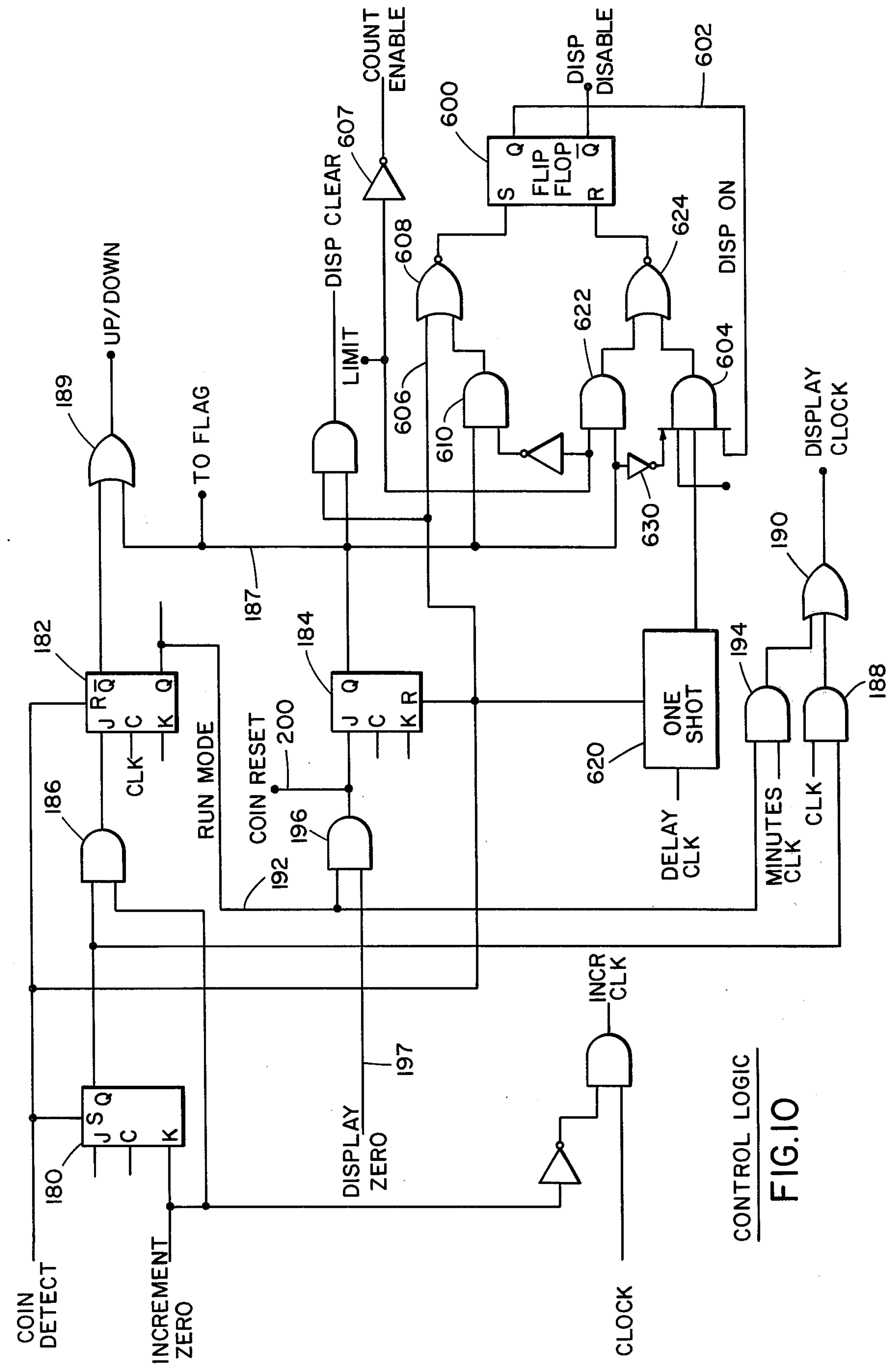
FIG. 10 is a schematic of the control logic block of FIG. 1A.

FIG. 10 illustrates the schematic arrangement of the control logic. The input signals include the coin detect signal from line 88, the increment zero signal from down counter 44, the display zero signal from block 52 and the clock and delay clock signals from the clock 58 and divider chain 60. When a coin is inserted in the meter, the coin detect signal is applied via line 88 to the control logic. This sets the logic into the increment mode by means of J–K flip-flop 180 and resets run mode flip-flop 182 and overtime mode flip-flop 184. Setting flip-flop 180 produces a high Q output to AND gates 186 and 188. Gate 186 operates flip-flop 182 to produce the up/down select signal for the up/down counters 48 through 50. Gate 188 is also enabled by the high signal from flip-flop 180 and gates the clock 58 through OR gate 190 to the up/down counters. Thus, in the increment mode the up/down counters count up at 35 KHz.

When the down counters 44 through 46 reach zero, they produce the increment zero signal which is applied to the K input of flip-flop 180 causing the Q output to go low. The increment zero signal is also applied directly to AND gate 186 and is effective for producing a high Q output from flip-flop 182. This shifts the operation of the counters 48 through 50 from up counting to down counting via OR gate 189. Increment zero is also effective via line 192 for switching operation from increment mode to run mode.

Line 192 enables AND gate 194 so that the minutes clock from the divider chain 60 is applied via OR gate 190 to the counters 48 through 50. It will be apparent then that the display clock is a variable clock signal which has a high rate for up counting and a 1/60th Hz rate for down counting. Line 192 is also provided via AND gate 196 to the J input of flip-flop 184. Gate 196, however, does not operate flip-flop 184 until the display zero signal is received on line 197. When the counters reach zero in the run mode, the display zero signal is produced from the display block and produces a high Q output from flip-flop 184. This initiates operation of the overtime mode.

Initiating the overtime mode returns the counters 48 through 50 to an up count via line 187 and OR gate 189 but maintains the minutes clock rate. The overtime mode is a period which can be as long as desired and comes into operation when the time purchased is exhausted. At the conclusion of the overtime mode, the meter and display shut down to conserve power, when limit memory 56 indicates expiration of the selected overtime period.

Each time the meter enters overtime mode the coin reset signal is produced on line 200 from the output of gate 196 and resets the coin detect and addressing block 40 so that subsequent coins inserted in the meter will receive initial values in the coin detect and memory blocks.

MRP OPERATION

The final portion of the control logic is associated with controlling operation of power to the display. Operation of the display is controlled by flip-flop 600, the Q output of which is fed back via line 602 to a four input AND gate 604. The $\overline{Q}$ output produces a display disable signal which is applied to the display and gating block 52 to shut off power at the end of the overtime mode or during what will now be described, the maximum revenue producing (MRP) mode of operation.

Flip-flop 600 is reset when no time is on the meter. Thus, the $\overline{Q}$ output is high, disabling the display. To turn on the display when a coin is inserted, the coin detect signal is provided via line 606 for resetting the overtime mode flip-flop 184, the run mode flip-flop 182, and serving as an input to NOR gate 608. Flip-flop 600 is set via NOR gate 608 producing a high Q output enabling the display. Gate 608 is also provided with an input from AND gate 610 and when operated from this gate similarly enables the display. The purpose of gate 610 is for use solely in conjunction with the MRP feature and is unnecessary in the event MRP is not utilized. MRP serves to turn the display off after a short period of time so that subsequent users of the meter will not obtain the benefits of a prior user's coin since they will not know whether or not there is any time left on the meter. When, however, a meter has run out of time, it is necessary to again actuate the display so that a police officer can detect a violation of parking regulations. This second turn on, when MRP is used, is accomplished by gate 610, the inputs of which are the overtime mode signal from flip-flop 184 and an inverted limit signal from the limit memory 56.

MRP operation is controlled by the four input AND gate 604. This AND gate receives as its inputs the Q output from flip-flop 600 on line 602, an input from a one shot multivibrator 620, and the inverted overtime signal from flip-flop 184. The fourth input to this gate is a logical zero or one, i.e., if the MRP feature is utilized, a plus voltage is applied to the fourth input, while if MRP is not desired this input is tied to ground.

Without MRP operation flip-flop 600 is reset to disable the display at the end of the overtime period, i.e., when the Q output from flip-flop 184 and the limit signal are present at the input to gate 622. Gate 622, via NOR gate 624, resets flip-flop 600. Without MRP, it will be apparent, that the display remains on from the time that the coin detect signal is first applied to set flip-flop 600 until the meter has gone through the increment, run and overtime modes.

Where MRP operation is desired, gate 610 is effective for restoring the display during overtime mode operation until meter shut down. For MRP operation the fourth input to gate 604 is tied to a plus voltage. The remaining three inputs to this gate, when high, are effective for actuating NOR gate 624 to reset the display flip-flop 600. Gate 604 is operated when (1) the display is on, (2) during the increment and run modes, but not the overtime mode, due to inverter 630 and (3) when the one shot 620 is operated by the delay clock.

When all of these conditions are true, then gate 604 is operated to reset flip-flop 600 and shut off the display. The one shot 620 is fired by the D clock signal which is produced by divider chain 60. The D clock signal can be set at various points on the divider chain as, for example, approximately ten seconds after each coin detect signal is received. Thus, when a user inserts a coin into the meter, the display will be enabled by flip-flop 600 for a preselected period of time as, for example, ten seconds. After this interval the D clock signal will fire one shot 620 resetting flip-flop 600 to disable the display. Thus, while the user who inserted the coin knows that he has purchased a given amount of time, this information is not available to subsequent users of the meter. The display will not come on again until the overtime mode is reached when its presence is necessary to permit ticketing of meter violations. The return of the display in overtime is via gate 610 as mentioned. If the optional push button 30 is added to the circuit, it is necessary to add to a logic circuit which will temporarily set flip-flop 600 to display the remaining time and then again disable the display after, say, ten seconds.

DISPLAY AND GATING

Figure 11:
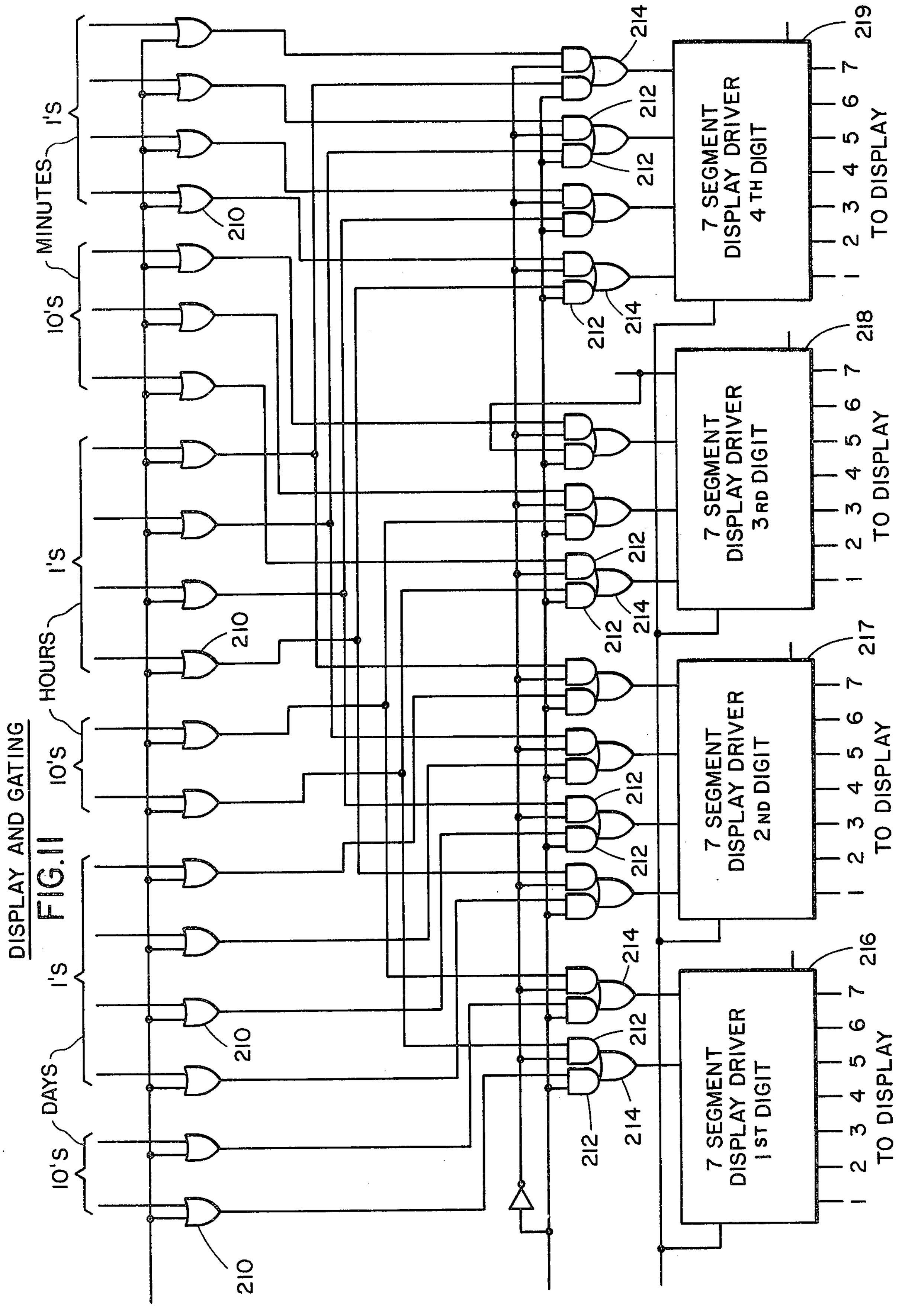
FIG. 11 is a schematic of the display and gating block of FIG. 1A.

FIG. 11 illustrates the schematic for the display and gating block 52. The inputs to the block are provided from the Q outputs of counters 48 through 50, the days, hours and minutes inputs being indicated on the drawing. The counter inputs are provided through a logic matrix comprising a plurality of OR gates 210, AND gate pairs 212, and OR gates 214. The logic matrix provides the display information to commercially available seven segment display drivers 216 through 219. As will be apparent, each driver operates one digit of a digital display device. Any commercially available type of digital display can be utilized, such as seven segment liquid crystal, electrochromic or led displays, and the like. While it is contemplated that a digital display of this type will be utilized in view of the low power consumption, it is, of course, possible to utilize other types of displays. For example, in place of the display and gating circuit illustrated in FIG. 11, a mechanical pointer type display could be utilized with an electromechanical interface.

LIMIT MEMORY AND COMPARATOR

Figure 12:
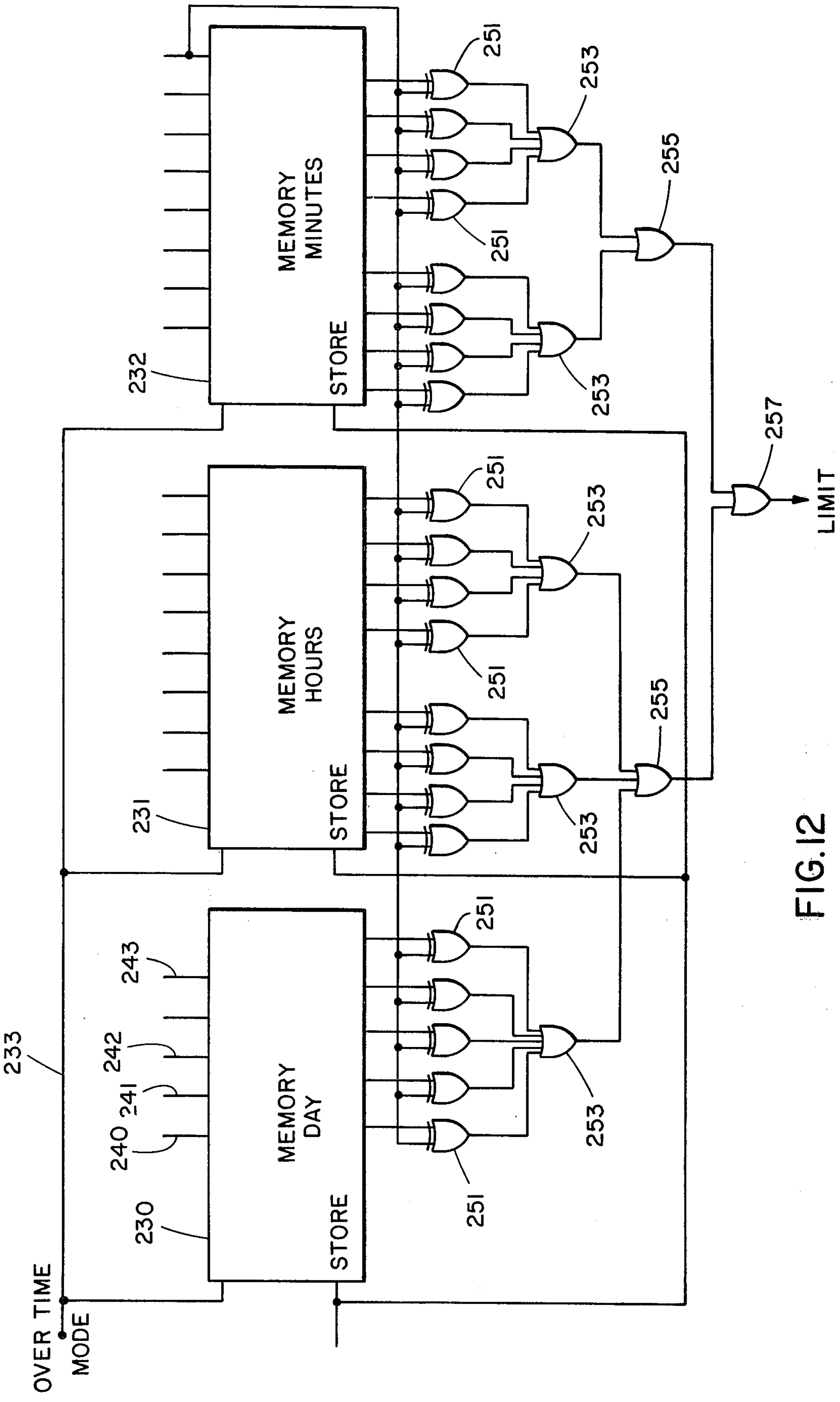
FIG. 12 is a schematic of the limit memory and comparator block.

The limit memory and comparator block 56 is illustrated in detail in FIG. 12. The limit memory includes three memory segments 230 through 232. Each memory segment may be of a commercially available type, such as RCA CD4036 or equivalents.

The purpose of limit memory block 56 is to store two distinct limit values. The first limit value represents the maximum time which can be purchased by the insertion of coins. The second limit stored is the overtime mode limit. The input to this circuit is the overtime mode signal from control logic 54 and is applied to memories 230 to 232 on line 233. In effect, this is a select line wherein the absence of the overtime mode signal selects the maximum time purchased limit while the presence of the overtime mode signal selects the overtime mode shut down limit.

The data inputs to the memories 230 to 232 are supplied on lines 240 through 243, etc., from the display lines of counters 48 through 50, as indicated schematically in FIG. 1A. The limit memory and comparator block serves to constantly compare the display inputs against one of two limit values depending upon which value is selected by the presence or absence of the overtime mode signal on line 233.

The result of each comparison is provided via a network of exclusive OR gate 251 which, in turn, are provided to a set of regular OR gates 253, 255, and ultimately, to OR gate 257. The signal produced by gate 257 is the limit signal supplied to control logic 54.

In the increment mode, it will be remembered that for each coin inserted the display outputs from the counters 48 through 50 will be increasing in value. When the display value equals the value set in the memories 230 through 232, the limit signal will be produced by gate 257. The presence of the limit signal at the control logic turns off the count enable signal (see FIG. 10) due to the presence of inverter 607. This is effective for causing the meter to ignore further coins, thereby leaving the meter set to its maximum value. When the overtime mode signal is applied to line 233, the display comparison produces an output at gate 257 when the overtime mode time limit is reached, resetting the flip-flop 600, thereby disabling the display and turning off the counters to conserve energy.

While I have shown and described embodiments of this invention in some detail, it will be understood that this description and illustrations are offered merely by way of example, and that the invention is to be limited in scope only by the appended claims.

I claim:

1. A token actuated timing device comprising:
a. means for storing preprogrammed numerical values at a plurality of addressable memory locations;
b. means for detecting the type and number of each type of token inserted into said device and for addressing a selected memory location each time a token is inserted, said location corresponding to the type and number of token of that type inserted;
c. first counter means for down counting from any present number to zero at a rate determined by an applied clock frequency and producing a zero detect signal on reaching zero;
d. means for presetting said first counter means to the value stored at said selected memory location;
e. second counter means for selectively counting up or down at a rate determined by an applied clock frequency;
f. means for producing first and second clock frequencies;
g. control means operative each time a token is detected for
  i. applying said first clock frequency to said first counter means to down count said first counter means to zero,
  ii. simultaneously up counting said second counter means at said first clock frequency until said zero detect signal is produced by said first counter means,
  iii. down counting said second counter means at said second clock frequency after said zero detect signal is produced, and
h. means for displaying the count on said second counter means.

2. The device of claim 1 further including means for
a. limiting the maximum value to which said second counter means can be raised by insertion of tokens;
b. shutting off powder to said display means a preselected time period after said second counter means has reached zero.

3. The device of claim 1 further including means for indicating when said second counter means has reached zero.

4. The device of claim 3 wherein said detecting and addressing means includes for each type of token:
a resettable up counter incremented by one for every token inserted, the output of said counter selecting an address location in said storing means, said up counter being reset to zero when said second counter means reaches zero.

5. The device of claim 1 wherein said control means further includes means for disabling said display means a preselected period of time after token insertion to prevent a determination of the count remaining on said second counter means by subsequent users of the device.

6. The device of claim 5 wherein said disabling means further includes means for reenabling said display means when said second counter means reaches zero to permit detection of violation of use regulations pertaining to said device.

7. The device of claim 6 further including means for
a. limiting the maximum value to which said second counter means can be raised by insertion of tokens;
b. shutting off power to said display means a preselected time period after said second counter means has reached zero.

8. The device of claim 7 wherein said control means further includes means for causing said second counter means to up count at said second clock frequency after reaching zero, said up count being displayed due to said means for reenabling and constituting a selectable grace period, said power shut off means again disabling said display at the conclusion of said grace period.

9. The device of claim 1 wherein said clock frequency means includes:
a. a crystal clock producing said first clock frequency;
b. a flip-flop chain, each flip-flop in the chain dividing said first clock frequency by two to produce a plurality of lower clock frequencies including said second clock frequency.

10. The device of claim 9 wherein said second clock frequency is one clock signal per minute.

11. The device of claim 1 wherein said display means includes:
a. means for converting the output of said second counting means to a seven segment display format;
b. seven segment display drivers receiving the converted output;
c. a seven segment display driven by said drivers.

12. The device of claim 11 wherein said seven segment display is a liquid crystal display.

13. A token actuated timing device comprising:
a. means for storing preprogrammed numerical values at a plurality of addressable memory locations;
b. means for detecting the type and number of each type of token inserted into said device and for addressing a selected memory location each time a token is inserted, said location corresponding to the type and number of token of that type inserted;
c. first counter means including three serially connected presettable counter segments corresponding to days, hours, and minutes for down counting from any preset number of zero at a rate determined by an applied clock frequency and producing a zero detect signal on reaching zero;

d. means for presetting said first counter means to the value stored at said selected memory location;

e. second counter means for selectively counting up or down at a rate determined by an applied clock frequency;

f. means for producing first and second clock frequencies;

g. control means operative each time a token is detected for i. applying said first clock frequency to said first counter means to down count said first counter means to zero, ii. simultaneously up counting said second counter means at said first clock frequency until said zero detect signal is produced by said first counter means, iii. down counting said second counter means at said second clock frequency after said zero detect signal is produced, and h. means for displaying the count on said second counter means.

14. The device of claim 13 further including logic gate means for presetting the hours and minutes counter segments to 23 and 59, respectively, each time a respective segment reaches zero during the down count.

15. A token actuated timing device comprising:

a. means for storing preprogrammed numerical values at a plurality of addressable memory locations;

b. means for detecting the type and number of each type of token inserted into said device and for addressing a selected memory location each time a token in inserted, said location corresponding to the type and number of token of that type inserted;

c. first counter means for down counting from any preset number to zero at a rate determined by an applied clock frequency and producing a zero detect signal on reaching zero;

d. means for presetting said first counter means to the value stored at said selected memory location;

e. second counter means including three serially connected presettable up/down counter segments for selectively counting up or down at a rate determined by an applied clock frequency;

f. means for producing first and second clock frequencies;

g. control means operative each time a token is detected for i. applying said first clock frequency to said first counter means to down count said first counter means to zero, ii. simultaneously up counting said second counter means at said first clock frequency until said zero detect signal is produced by said first counter means, iii. down counting said second counter means at said second clock frequency after said zero detect signal is produced, and h. means for displaying the count on said second counter means.

16. The device of claim 15 when said segments correspond to days, hours and minutes, respectively, and said hours and minutes segments:

i. during up counting reset to zero and carry to the days and hours segments, respectively, when they reach 24 and 60, respectively;

ii. during down counting reset to 23 and 59, respectively, and borrow from the days and hours segments, respectively.

17. A token actuated timing device comprising a. means for storing a numerical value at an addressable memory location;

b. means for addressing said memory location responsive to insertion of a token;

c. first counter means for down counting from any preset number to zero;

d. means for presetting said first counter means to the value at said memory location;

e. second counter means for selectively counting up or down;

f. control means for up counting said second counter means while simultaneously down counting said first counter means from the value preset therein to load said second counter means, and for down counting said second counter means at a real time rate after said first counter means reaches zero; and g. means for displaying the count on said second counter means.

* * * * *